(12) United States Patent
Edwards et al.

(10) Patent No.: US 9,754,312 B2
(45) Date of Patent: Sep. 5, 2017

(54) TECHNIQUES FOR PERSONALIZING SELF CHECKOUTS

(75) Inventors: Thomas V. Edwards, Suwanee, GA (US); Alok Kumar, Snohomish, WA (US)

(73) Assignee: NCR CORPORATION, Duluth, GA (US)

(*) Notice: Subject to any disclaimer, the term of this patent is extended or adjusted under 35 U.S.C. 154(b) by 0 days.

(21) Appl. No.: 13/173,998

(22) Filed: Jun. 30, 2011

(65) Prior Publication Data

US 2013/0232037 A1    Sep. 5, 2013

(51) Int. Cl.
   *G06Q 30/00* (2012.01)
   *G06F 17/30* (2006.01)
   *G06Q 30/06* (2012.01)
   *G07G 1/00* (2006.01)

(52) U.S. Cl.
   CPC ....... *G06Q 30/0641* (2013.01); *G07G 1/0036* (2013.01)

(58) Field of Classification Search
   CPC .................................................. G06C 30/0641
   USPC ............................................... 705/26.1–27.2
   See application file for complete search history.

(56) References Cited

U.S. PATENT DOCUMENTS

| | | | |
|---|---|---|---|
| 6,991,066 B2 * | 1/2006 | Persky | 186/59 |
| 2002/0079367 A1 * | 6/2002 | Montani | 235/383 |
| 2008/0147511 A1 * | 6/2008 | Edwards | 705/18 |
| 2010/0030578 A1 * | 2/2010 | Siddique et al. | 705/3 |
| 2011/0010271 A1 * | 1/2011 | Black et al. | 705/27.2 |
| 2011/0093361 A1 * | 4/2011 | Morales | 705/26.62 |
| 2011/0125783 A1 * | 5/2011 | Whale et al. | 707/769 |
| 2011/0246329 A1 * | 10/2011 | Geisner et al. | 705/27.1 |
| 2012/0036042 A1 * | 2/2012 | Graylin et al. | 705/26.41 |
| 2012/0110467 A1 * | 5/2012 | Blake et al. | 715/745 |

OTHER PUBLICATIONS

World's first 'convertible' self-checkout heads family of innovative systems from NCR. (Feb 16, 2000). PR Newswire Retrieved from https://search.proquest.com/docview/449424373?ac-countid=14753.*

* cited by examiner

*Primary Examiner* — Kathleen Palavecino
(74) *Attorney, Agent, or Firm* — Schwegman Lundberg & Woessner, PA

(57) ABSTRACT

A customer/user registers User Interface (UI) preferences for a self checkout system. Subsequently, when the user properly authenticates with a self checkout system, the preferences are recalled and used to dynamically configure the UI of the self checkout system that the user is interacting with to complete a transaction with an enterprise.

16 Claims, 3 Drawing Sheets

TECHNIQUES FOR PERSONALIZING SELF CHECKOUTS

BACKGROUND

Consumers are increasingly using automated mechanisms to perform every day transactions. Kiosks exist to avoid enterprise personnel and lines. These automated kiosks allow consumers to perform transactions with an enterprise or agency with little to no human intervention.

The general availability of retail self-checkout systems has naturally led to taking any and all measures practical to increase utilization of these cost effective systems, and maximize the throughput at these systems.

Analysis of the through-put at self-checkout lanes quickly shows that shoppers often need to navigate the same series of user interface options to reach the desired option, for example payment with a debit card, with $20 cash back; or executing the transaction in Spanish versus the default language of English.

Acceptance of the self-checkout systems by shoppers (customers and/or users) is based on many factors. The level of comfort the user feels with the system. A hearing impaired shopper may feel more comfortable with the system volume adjusted higher than the default, or by selecting an alternate voice that was more easily understood. Color blind shoppers may appreciate the ability the change the system color themes to be more easily visible. The ability to select color themes is also of interest to other shoppers, such as younger shoppers who are attracted by the ability to personalize the aesthetic features of the system.

Retailers are also hindered by the inability to easily customize User Interface (UI) themes. As Self-Checkout gains acceptance and larger displays become deployed, the retailer may benefit from customization of the UI.

In addition, customers with disabilities, such as sight or hearing, find it difficult to use traditional kiosk systems. Some, banks at Automated Teller Machines (ATMs) include keys that have brail engraved on the buttons; however, this is of little help to a customer using a touch screen where there is no engraving whatsoever and the keys move around on the screen.

In fact, there is very little customization that occurs at enterprise kiosk systems. Typically, the enterprise tries to evaluate how customers are using the kiosk systems and then issue upgrades to the interfaces of the kiosk system to address improved usability. Yet, this process is slow and does not account for individual needs or preferences of each customer. Moreover, the traditional approaches completely fail to address accessibility issues, which may be needed with customers having varying degrees of hearing and sight impairments.

SUMMARY

In various embodiments, techniques for personalizing self checkout systems are presented. According to an embodiment, a method for registering a customer's preferences for use with self-checkout system is discussed.

Specifically, a principal is interacted with to acquire user interface (UI) preferences for a user; the UI preferences for a self checkout system of an enterprise. A user identity is confirmed for the user and a preference record is created in a repository for the user based on the user identity and the UI preferences. Next, the preference record is delivered on demand to the self checkout system when the user interacts with the self checkout system to complete a transaction with the enterprise.

DETAILED DESCRIPTION

Figure 1:
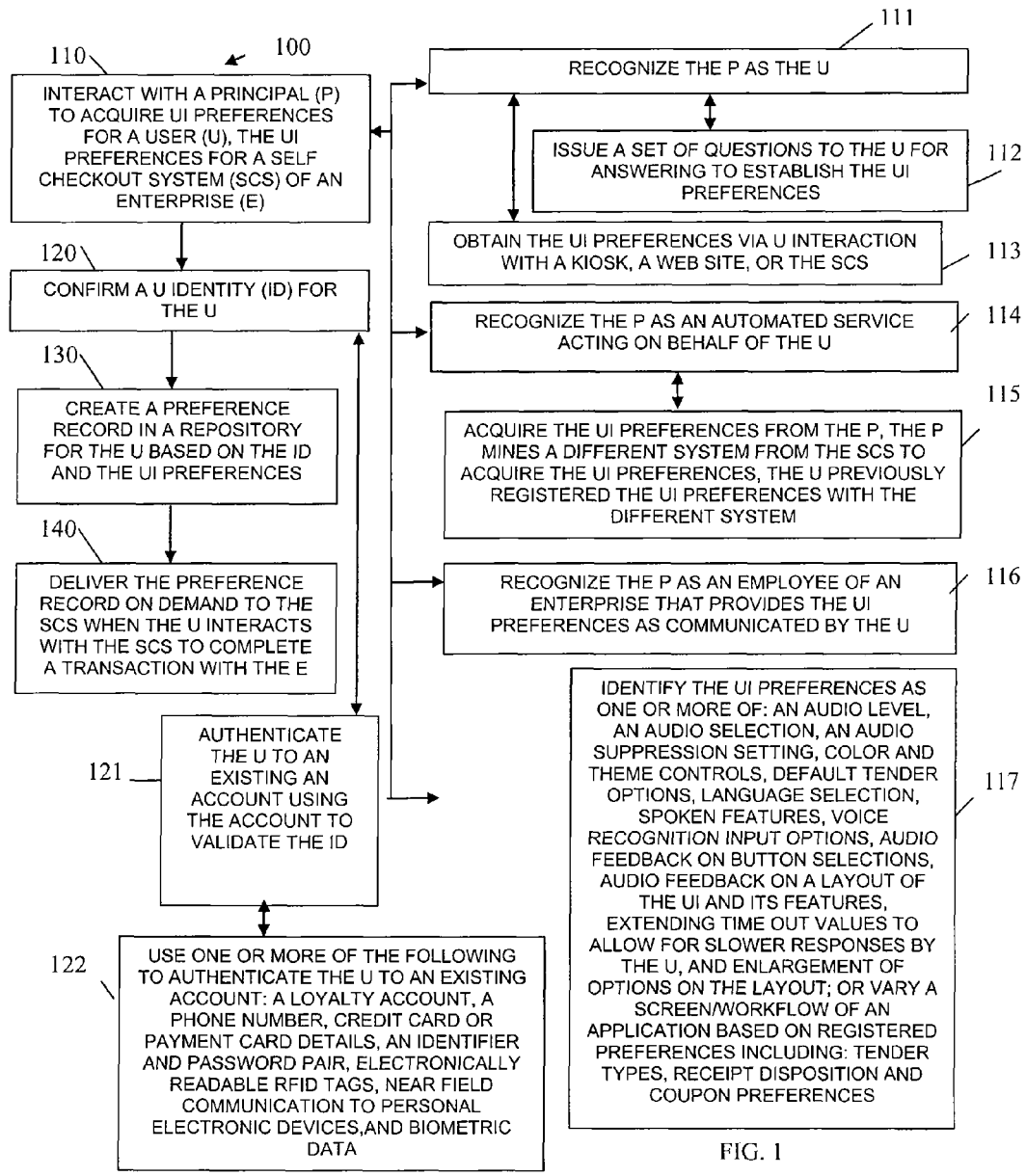
FIG. 1 is a diagram of a method for registering a customer's preferences for use with a self-checkout system is provided, according to an example embodiment.

The aforementioned industry problems are resolved by introducing a high degree of personalization into self-checkout systems. Many self-checkout User Interface (UI) components can be opened up for personalization including:
1. audio level
2. audio selection
3. audio suppression
4. color and UI control themes
5. default tender options
6. language selection Personalization requires identification of the shopper identity, and storage and retrieval of personalized options. Shopper identification is established via frequent shopper programs in place with the Retailer, or other identifications such as phone number, biometric, and payment options.

Registration can take place through a Web interface, a kiosk in the store, or on the actual self-checkout equipment. Registration can be a formal data entry process, or simply the affirmative answer to a question during the checkout process such as "Do you want the system to remember your changes?" An affirmative answer to this question qualifies as a registration for the authenticated shopper.

In an embodiment, a centralized database provides storage of the user identity, user preferences, and system preferences. Users are registered automatically by their participation in other store systems (such as Frequent Shopper programs). This user identity is then used to store, retrieve, and learn preferences through the application component. At the completion of the transaction, the user may be prompted to save changes made to "user" preferences, effectively registering them into the personalization system and storing their settings; e.g. Language=Spanish.

The FIG. 1 discussed below addresses the processing associated with registration of customer preferences for UI features of a self checkout system.

In order for the system to be operationally viable, the system (and user) personalization uses a management component that provides the necessary controls, such as enabling and disabling the system, allowing definition and management of trust levels and associated security profiles, tender profiles, etc.

The FIG. 2 discusses processing that occurs after a customer has registered personalization features for a self checkout system and is subsequently at a self checkout system interfacing therewith.

Moreover, the techniques herein allow the customer to either register through the personalization web site or indicate through some local mechanism at the lane that they would like to use an experience better suited to people with visual or physical impairments. Some of the features that could be added under this category would be:

Additional audible queues such as speaking totals at finish and pay, speaking specific tender totals (such as food stamp totals), audio feedback on button presses, overrides for normal say price options (customers such as Tesco have them turned off by default) to ensure each price is spoken, and more detailed information on the physical layout of the machine.

Modified screen layouts that would enlarge the main areas of the screen, perhaps by sacrificing some of the receipt real estate and logo areas, so that the screen is more easily accessible.

Extended time out values to allow for a slower response time.

The preferences are saved as part of the customer's personalization record so that the self checkout system automatically configures itself when the customer scans his/her loyalty card.

Grouping these feature options (for hearing and sight impairments) on the personalization web site under a single "Accessibility Options" feature can also be achieved.

Moreover, the user's preference declaration that they never use coupons can be used to optimize the SCS work/screen flow to not prompt for the insertion of coupons at the end of the transaction thereby speeding up the checkout process.

It is within this initial context that specific embodiments are now discussed with reference to the FIGS. 1-3.

FIG. 1 is a diagram of a method 100 for registering a customer's preferences for use with a self-checkout system is provided, according to an example embodiment. The method 100 (hereinafter "UI personalization registering manager") is implemented as instructions programmed and residing on a non-transitory computer-readable (processor-readable) storage medium and executed by one or more processors. The processors are specifically configured and programmed to process the UI personalization registering manager. In an embodiment, the UI personalization registering manager may operate over a network. The network is wireless or a combination of wired and wireless.

In an embodiment, the UI personalization registering manager executes on a server device to process registration options of the customer/user. Agents of the UI personalization registering manager can execute on self checkout systems, a kiosk, and/or via a web interface. The customer interacts with a web interface, kiosk, and/or web interface to communicate preferences to the UI personalization registering manager processing on the server or in a cloud environment.

At 110, the UI personalization registering manager interacts with a principal for purposes of acquiring user interface (UI) preferences for a user. The UI preferences drive the interface and features of an interface for a self checkout system or device. The UI preferences permit the user to personalize the experience that the user has with the self checkout system when the user subsequently conducts a transaction on the self checkout system.

According to an embodiment, at 111, the UI personalization registering manager recognizes the principal as the user.

Continuing with the embodiment of 111 and at 112, the UI personalization registering manager issues a set of questions to the user that the user provides answers to. The answers are then used to establish the UI preferences. So, questions and answers can drive collection of the UI preferences.

Still continuing with the embodiment of 111 and at 113, the UI personalization registering manager obtains the UI preferences via the user's interaction with a kiosk, a web site, or the self checkout system. In other words, a variety of devices, including the self checkout system, can be used for the user to register the user preferences with the UI personalization registering manager. In some cases, the web site can be interacted with via a cell phone of the user to provide registration via a cell phone equipped to access the web.

In another case, at 114, the UI personalization registering manager recognizes the principal as an automated service acting on behalf of the user. Here, the automated service can provide the user preferences via a variety of mechanisms, such as mining different preferences that the user had with a variety of different systems and aggregating them to form the user preferences for the self checkout system.

For example, and continuing with the embodiment of 114 and at 115, the UI personalization registering manager acquires the UI preferences from the principal. The principal mines an entirely different system or set of systems (different from the self checkout system) to acquire the UI preferences. The user previously registered the UI preferences with this different system or these different systems.

In still another situation, at 116, the UI personalization registering manager recognizes the principal as an employee of an enterprise that provides the UI preferences. Here, the employee interacts with the UI personalization registering manager to provide the UI preferences on behalf of the user. This situation can occur when the user is impaired in some manner and unable or unwilling to perform the registration of the UI preferences. For example, the user may be sight or hearing impaired.

In an embodiment, at 117, the UI personalization registering manager identifies the preferences as one or more of: an audio level, an audio selection, an audio suppression setting, color and/or theme controls, default tender options, language selections, spoken features, voice recognition input options, receipt disposition (no receipt, emailed receipt, printed receipt, printed conditionally based on transaction amount or tender type) audio feedback on button selections, audio feedback on layout of the UI and its features, extending time out values to allow for slower responses by the user with the UI, and/or enlargement options on the layout. Essentially, the user, via the user preferences, personalizes the UI that is presented on the self checkout system during a transaction that the user has with the self checkout system at an enterprise.

At 120, the UI personalization registering manager confirms a user identity for the user. This can be achieved in a number of ways.

For example, at 121, the UI personalization registering manager authenticates the user to an existing account of an enterprise by using the account to obtain or resolve the user identity.

Continuing with the embodiment of 121 and at 122, the UI personalization registering manager uses one or more of the following to authenticate the user to an existing account: a loyalty account of the user, a phone number of the user, credit card or payment card details, an identifier and password combination, electronically readable token such as a Radio Frequency Identifier (RFID) tagged item or Near Field Communication (NFC) to a tagged personal electronic device and/or biometric data for the user. It also expected that multiple authentication types may be registered for the same user allowing them the option of which registered authorization type to use for a particular transaction, for example, a swipable loyalty card in the store and a phone number/pin for web access.

At 130, the UI personalization registering manager creates a preference record in a repository for the user based on the identity and the UI preferences.

At 140, the UI personalization registering manager delivers the preference record on demand to the self checkout system when the user interacts with the self checkout system to complete a transaction with the enterprise. The transaction is personalized by the user preferences for the UI that processes on the self checkout system.

Figure 2:
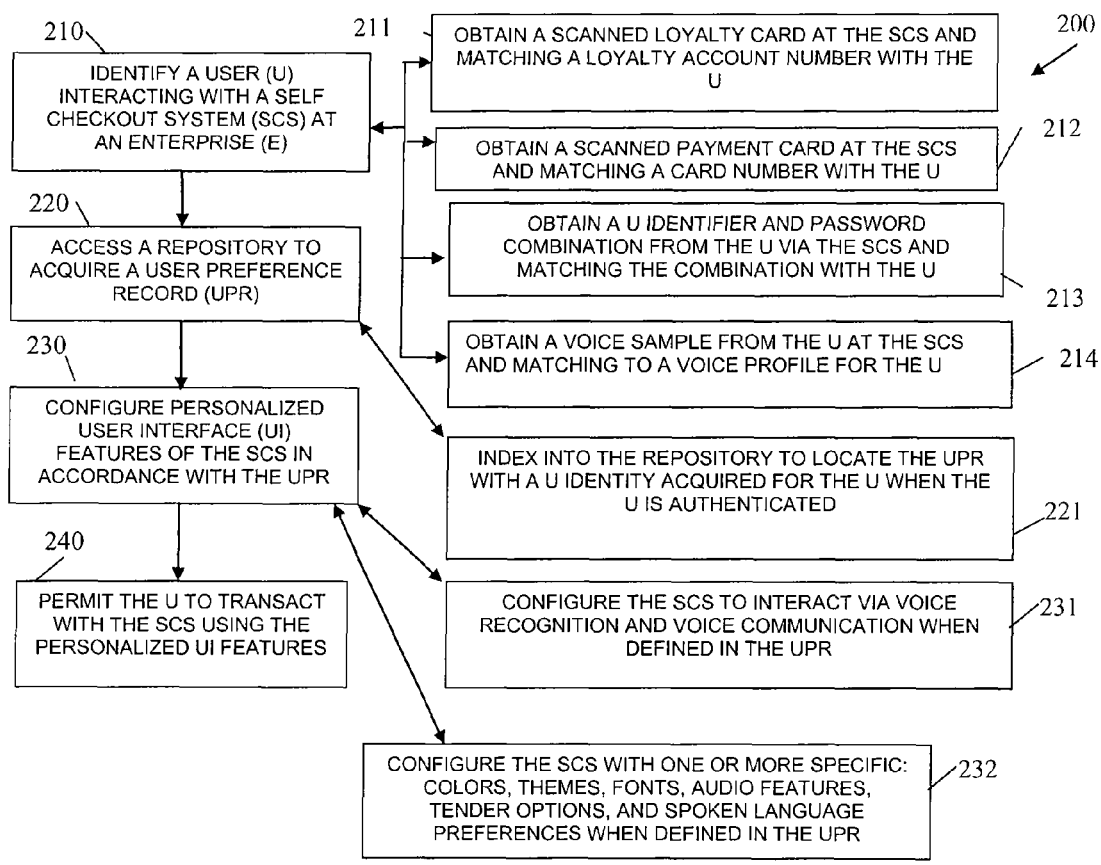
FIG. 2 is a diagram of a method for customizing an interface of a self checkout system for a customer, according to an example embodiment.

FIG. 2 is a diagram of a method 200 for customizing an interface of a self checkout system for a customer, according to an example embodiment. The method 200 (hereinafter "customer UI customization manager") is implemented as instructions and programmed within a non-transitory computer-readable (processor-readable) storage medium that executes on one or more processors of a mobile device, the processors of the mobile device are specifically configured to execute the customer UI customization manager. In an embodiment, the customer UI customization manager is operational over a network; the network is wireless or a combination of wired and wireless.

The customer UI customization manager describes processing actions from the perspective of self checkout system or kiosk that a customer is interacting with at an enterprise to complete a transaction with that enterprise. The customer has already registered UI preferences via the processing of the method 100 discussed above with respect to the FIG. 1.

At 210, the customer UI customization manager identifies a user interacting with a self checkout system at an enterprise for the purpose of the user conducting a transaction with the enterprise.

According to an embodiment, at 211, the customer UI customization manager obtains a scanned loyalty card at the self checkout system. The scan produces a loyalty account number and that number is matched in a repository to one that is associated with the user.

In another case, at 212, the customer UI customization manager obtains a scanned payment card at the self checkout system. The scan produces a card number and that number is matched in a repository to one that is associated with the user. In some cases, the card number may be hashed to a key and the key used to identify the user, since the payment card information may not be authorized for storage in the repository by the user.

In another case, at 213, the customer UI customization manager obtains a user identifier and password combination from the user via the self checkout system. This combination is matched to the user.

In yet another situation, at 214, the customer UI customization manager obtains a voice sample from the user at the self checkout system. This voice sample is matched to a voice profile of the user to identify the user. It is noted that this may be useful for vision impaired users. It is also noted that other biometrics can be used as well to identify the user.

At 220, the customer UI customization manager accesses a repository to acquire a user preference record. This is achieved once the identity for the user is resolved. So, the repository is searched via the identity and the user preference record is returned.

In other words, at 221, the customer UI customization manager indexes into the repository to locate the user preference record with a user identity acquired when the user is authenticated.

At 230, the customer UI customization manager configures personalized user interface features of the self checkout system in accordance with the dictates defined in the user preference record.

According to an embodiment, at 231, the customer UI customization manager configures the self checkout system to interact via voice recognition and voice communication when defined in the user preference record, such as when the user is sight impaired.

In another case, at 232, the customer UI customization manager configures the self checkout system with one or more specific: colors, themes, fonts, audio features, tender options, and/or spoken language preferences when defined by the user preference record.

At 240, the customer UI customization manager permits the user to transact with the self checkout system using the personalized UI features defined by the user preferences and configured within the UI of the self checkout system by the customer UI customization manager.

Figure 3:
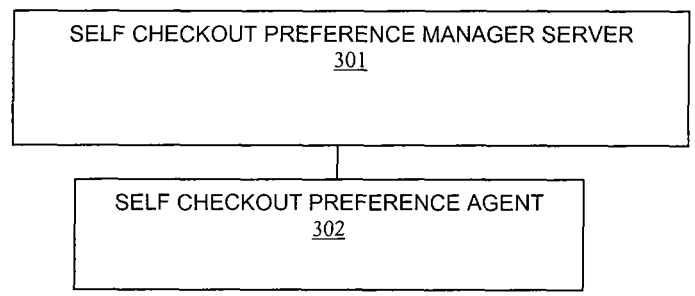
FIG. 3 is a diagram of a personalized self checkout interface system, according to an example embodiment.

FIG. 3 is a diagram of a personalized self checkout interface system 300, according to an example embodiment. The personalized self checkout interface system 300 includes one or more processors that are specifically configured to perform, inter alia, the processing associated with the methods 100 and 200 of the FIGS. 1 and 2, respectively. Furthermore and in an embodiment, the personalized self checkout interface system 300 is operational over a network and the network can be wireless or a combination of wired and wireless. In an embodiment, the network is the Internet. In another case, the network is a cellular network. It may also be that the network uses both the Internet and a cellular network.

The personalized self checkout interface system 300 includes a self checkout preference manager server 301 and a self checkout preference agent 302. Each of these and their interactions with one another will now be discussed in turn.

The self checkout preference manager server 301 is a physical machine or a Virtual Machine (VM) accessible over a network. In some cases the self checkout preference manager server 301 is accessible via one or more cloud processing environments. Example processing associated with the self checkout preference manager server 301 was presented above with reference to the FIG. 1.

The self checkout preference manager server 301 is configured to obtain (register) user preferences for a user interface of a self checkout device. The self checkout preference manager server 301 is also configured to provide the user preferences on demand to the self checkout preference agent 302.

According to an embodiment, the self checkout preference manager server 301 is configured to acquire the user preferences for the user directly from the user, indirectly through a principal of the user, or through a different self checkout system that the user has registered with before and that has similar features to that which is associated with the self checkout device.

The self checkout preference agent 302 is implemented, programmed, and resides within a non-transitory computer-readable storage medium and executes on a self checkout device for a self checkout system. Example processing associated with the self checkout preference agent 302 was presented above in detail with respect to the method 200 of the FIG. 2.

The self checkout preference agent 302 is configured to process the user preferences and configure the UI of the self checkout device for purposes of personalizing a transaction between a user and the self checkout device.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    interacting, via one or more processors, with a principal through a self checkout system interface of a self checkout system to acquire user interface (UI) preferences for a user, the UI preferences for a self checkout system of an enterprise, wherein the self checkout system includes a checkout lane, and wherein at least one UI preference includes extending time out values to allow for slower responses by the user while interacting with the self checkout system, wherein interacting further includes acquiring the UI preferences from the user as: an audio level, an audio selection, an audio suppression setting, color settings, control theme settings, default tender options, a language selection, spoken features, voice recognition input options, audio feedback on button selections, audio feedback on a layout of the UI and its features, and enlargement of options on the layout of the UI;
    confirming, by the one or more processors, a user identity for the user;
    creating, by the one or more processors, a preference record in a repository for the user based on the user identity and the UI preferences; and
    delivering, by the one or more processors, the preference record on demand to the self checkout system when the user interacts with the self checkout system to complete a transaction with the enterprise; and
    configuring by the self checkout system the UI preferences for the user, wherein configuring further includes a) modifying screen layouts for enlarging select areas of a screen with other areas of the screen decreased for the self checkout system for interaction by the user during the transaction, b) extending processing time out values for the transaction in response to particular UI preferences of the user, and c) enabling audible cues of the self check out system for providing audible feedback to the user during the transaction.

2. The method of claim 1, wherein interacting further includes recognizing the principal as the user.

3. The method of claim 2, wherein recognizing further includes issuing a set of questions to the user for answering to establish the UI preferences.

4. The method of claim 2, wherein recognizing further includes obtaining the UI preferences via user interaction with a kiosk, a web site, or the self checkout system.

5. The method of claim 1, wherein interacting further includes recognizing the principal as an automated service acting on behalf of the user.

6. The method of claim 5, wherein recognizing further includes acquiring the UI preferences from the principal, the principal mines a different system from the self checkout system to acquire the UI preferences, the user previously registered the UI preferences with the different system.

7. The method of claim 1, wherein interacting further includes recognizing the principal as an employee of an enterprise that provides the UI preferences as communicated by the user.

8. The method of claim 1, wherein confirming further includes authenticating the user to an existing an account of an enterprise and using the account to obtain the user identity.

9. The method of claim 8, wherein authenticating further includes using one or more of the following to authenticate the user to an existing account: a loyalty account, a phone number, credit card or payment card details, an identifier and password pair, electronically readable RFID tags, near field communication to personal electronic devices, and biometric data.

10. A method, comprising:
    identifying, by one or more processors, a user interacting with a self checkout system through a self checkout system interface and the self checkout system at an enterprise, wherein the self checkout system includes a checkout lane;
    accessing, by the one or more processors, a repository to acquire a user preference record;
    configuring, by the one or more processors, personalized user interface (UI) features of the self checkout system with the user preference for: an audio level, an audio selection, an audio suppression setting, color settings, control theme settings, default tender options, a language selection, spoken features, voice recognition input options, audio feedback on button selections, audio feedback on a layout of the UI and its features, and enlargement of options on the layout of the UI, wherein configuring further includes a) modifying screen layouts for enlarging select areas of a screen with other areas of the screen decreased for the self checkout system for interaction by the user during a transaction, b) extending processing time out values for the transaction in response to particular ones of the UI features of the user, and c) enabling audible cues of the self check out system for providing audible feedback to the user during the transaction; and
    permitting, by the one or more processors, the user to transact with the self checkout system using the personalized UI features.

11. The method of claim 10, wherein identifying further includes obtaining a scanned loyalty card at the self checkout system and matching a loyalty account number with the user.

12. The method of claim 10, wherein identifying further includes obtaining a scanned payment card at the self checkout system and matching a card number with the user.

13. The method of claim 10, wherein identifying further includes obtaining a user identifier and password combination from the user via the self checkout system and matching the combination with the user.

14. The method of claim 10, wherein identifying further includes obtaining a voice sample at the self checkout system from the user and matching to a voice profile for the user.

15. The method of claim 10, wherein accessing further includes indexing into the repository to locate the user preference record with a user identity acquired for the user when the user is authenticated.

16. The method of claim 10, wherein configuring further includes configuring the self checkout system to interact via voice recognition and voice communication when defined in the user preference record.

\* \* \* \* \*